United States Patent
Belissent (10) Patent No.: US 6,789,203 B1
(45) Date of Patent: Sep. 7, 2004

(54) METHOD AND APPARATUS FOR PREVENTING A DENIAL OF SERVICE (DOS) ATTACK BY SELECTIVELY THROTTLING TCP/IP REQUESTS

(75) Inventor: Jacques E. Belissent, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 868 days.

(21) Appl. No.: 09/604,552
(22) Filed: Jun. 26, 2000
(51) Int. Cl.$^7$ .............................................. G06F 11/30
(52) U.S. Cl. ...................... 713/201; 709/223; 370/229
(58) Field of Search ............................... 709/223, 227; 713/200, 201; 370/229

(56) References Cited

U.S. PATENT DOCUMENTS

| | | | | |
|---|---|---|---|---|
| 6,006,264 | A | | 12/1999 | Colby et al. ................. 709/226 |
| 6,119,235 | A | * | 9/2000 | Vaid et al. ................... 713/201 |
| 6,189,033 | B1 | * | 2/2001 | Jin et al. ..................... 709/225 |
| 6,222,856 | B1 | * | 4/2001 | Krishnan et al. ........... 370/468 |
| 6,473,793 | B1 | * | 10/2002 | Dillon et al. ............... 709/223 |
| 6,598,034 | B1 | * | 7/2003 | Kloth .......................... 706/47 |

FOREIGN PATENT DOCUMENTS

| | | | |
|---|---|---|---|
| EP | 0932282 A2 | 7/1999 | ............ H04L/12/56 |

OTHER PUBLICATIONS

"Strategies to Protect Against Distributed Denial of Service (DdoS) Attacks", Cisco Systems, Online!Feb. 9, 2000, XP002945619, http://www.cisco.com/warp/public/707newsflash.html.

"Study on the Prevention of SYN flooding by Using Traffic Policing", NOMS 2000: IEEE/IFIP Network Operations and Management Symposium, Apr. 10–14, 2000, pp. 593–604, XP010376711, Honolulu.

EPO Search Report in Corresponding PCT Application.

* cited by examiner

*Primary Examiner*—Matthew Smithers
*Assistant Examiner*—Minh Nguyen
(74) *Attorney, Agent, or Firm*—Beyer Weaver & Thomas, LLP (57) ABSTRACT

According to the present invention, method, apparatus, and computer readable medium for preventing a DoS attack without notifying the DoS attacker are disclosed. In one embodiment, in a client/server environment, a DoS defense module determines a connection request rate for a particular client. The client is blocked if the connection request rate is determined to be above a first pre-determined threshold. If, however, the connection request rate is below the first threshold but above a second threshold, then the client's connection request rate is slowed, or throttled, down to a rate consistent with a connection delay interval that's is based upon a throttling factor.

17 Claims, 7 Drawing Sheets

METHOD AND APPARATUS FOR PREVENTING A DENIAL OF SERVICE (DOS) ATTACK BY SELECTIVELY THROTTLING TCP/IP REQUESTS

FIELD OF THE INVENTION

The present invention relates in general to client/server data communication systems and more particularly, the present invention is directed towards a method and apparatus that automatically provides protection against a potential DoS attack.

BACKGROUND OF THE INVENTION

Computer systems are well known in the art and have become a business staple and are also found in many homes. One feature available to the business world is that of using electronic mailing (e-mail) to send and receive messages and other information to and from one another in a business setting. Similarly, home computers, such as desk tops or laptops, and other information devices, such as personal digital assistants (PDAs), allow telecommuting such that a user can connect to the user's work server and down load and upload messages.

The e-mail system allows clients of a network system, which is maintained by a server system, to send messages or data from one user to another. In order to minimize disk space and requirements as well as to maximize functionality and consistency of the electronic mailing engine used in the network system, the engine is typically located on the server and is merely accessed by a client in order to send messages or retrieve messages to or from another user or client on the server system. In this way, the client system typically allows the user to perform such operations as composing, updating, and sending messages while the server in such a system provides, in part, a server based message repository as well as providing message transmission and reception functions for the user at the client level.

Figure 1:
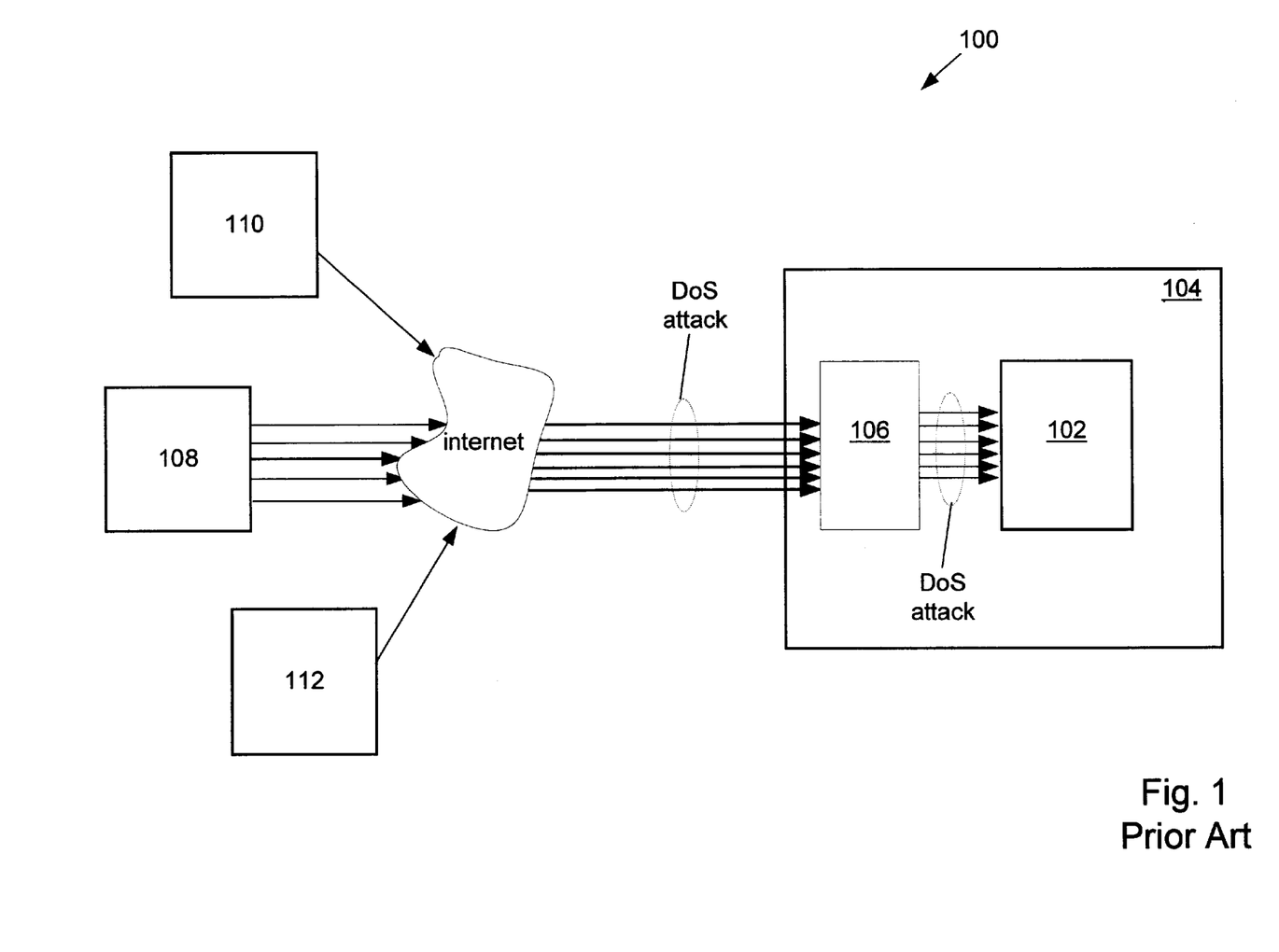
FIG. 1 showing a messaging system suitable for large, distributed networks such as the Internet or large scale intranet systems.

One such email system is described with reference to FIG. 1 showing a messaging system 100 suitable for large, distributed networks such as the Internet or large scale intranet systems. The system 100 typically includes a central server 102 resident in a computer system 104 that can take the form of a mainframe system as well as a distributed type computing system. When the system 100 is a messaging system, such as an email system, the central server 102, as the central email server, is coupled to an interface, such as a firewall 106, that mediates the flow of information between the mail server 102 and its n clients represented as client 108, client 110, and client 112. Typically, when the client 108, for example, desires to establish a channel to the server 102, the client 108 will generate a request to open a connection to the mail server 102 by any one of a variety of transports and protocols that are submitted directly by the requesting client 108, via, for example, TCP/IP as an SMTP message from an Internet system. Such a connection request can be submitted by using a dial-up modem using the PhoneNet protocol, DECnet as a MAIL-11 message, DECnet as an SMTP message, UUCP, an X.400 transport, SNA, and so on. For instance, at sites with an Internet connection, Internet addresses are normally routed through an SMTP over TCP/IP channel, however, at sites with only a UUCP connection, Internet addresses would instead be routed through a UUCP channel.

Once the connection request has been accepted, a channel is open between the requesting client 108 and the server computer 102 allowing for the transfer of data. In some cases, however, the requesting client 108 can, either intentionally or unintentionally, disrupt the operations of the server 102 by generating a large number of connection requests within a relatively short length of time (i.e., connection request rate). A denial of service (DoS) attack has been defined as those situations where a high connection request rate has been intentionally initiated by, what would be in this case, an attacker having the intent to disrupt, or even, halt the operations of the server 102 by forcing the server 102 to allocate resources to the processing of the multitude of requests.

More specifically, a denial of service attack is an incident in which a user or organization is deprived of the services of a resource they would normally expect to have. Typically, the loss of service is the inability of a particular network service, such as e-mail, to be available or the temporary loss of all network connectivity and services. In the worst cases, for example, a Web site accessed by millions of people can occasionally be forced to temporarily cease operation. A denial of service attack can also destroy programming and files in a computer system.

A conventional approach to defending against such DoS attacks is based upon the concept of determining the identification of a potential attacker by monitoring a connection request rate for each requesting client. A requesting client whose connection request rate is higher than a predetermined threshold is identified as an attacker and is blocked accordingly.

Unfortunately, however, even though using the conventional DoS defense stratagem has the potential to thwart the DoS attack, there are several problems with this approach. One such problem is the fact that the attacker has now been notified that the attack has been discovered and all that is now required to resume the attack is for the attacker to change locations. This process of identifying, blocking, and changing location can be repeated ad infinitum requiring a substantial amount of server processing resources anyway. Another problem with this approach is that in some cases a legitimate requesting client can have a short term burst of connection requests without being an attack. By cutting off these legitimate "burst" clients, substantial economic costs can be incurred, not the least of which, is loss of revenue due to lost sales, etc.

Therefore, it would be desirable to have an improved method and apparatus for preventing a DoS attack.

SUMMARY OF THE INVENTION

To achieve the foregoing, and in accordance with the purpose of the present invention, method, apparatus, and computer readable medium for preventing a DoS attack without notifying the DoS attacker are disclosed. In one embodiment, in a client/server environment, a method for preventing a denial of service (DoS) attack by a requesting client on a server computer is described. A connection request at a time $t_n$ in a throttling interval m is received and if the time $t_n$ is not at a beginning of the throttling interval m then an interval m connection request count is incremented. If the interval m connection request count is determined to be greater than a rejection threshold associated with the requesting client then the connection request is rejected. If, however, it is determined that the interval m connection request count is not greater than the rejection threshold then the server computer waits an interval m wait time before accepting the request.

In another embodiment of the invention an apparatus for defending against a DoS attack is described. The apparatus includes a connection request receiver unit for receiving a connection request at a time $t_n$ in a throttling interval m from the requesting client, an incrementing unit coupled to the connection request receiver unit for incrementing an interval m connection request count when the time $t_n$ is not at a beginning of the throttling interval m. The apparatus also includes a processor unit coupled to the interval m connection request count buffer arrainged to determine if the interval m connection request count is greater than a rejection threshold associated with the requesting client and a request throttler unit coupled to the processor unit arrainged to reject the connection request when it is determined that the interval m connection request count is greater than the rejection threshold, and wait an interval m wait time when it is determined that the interval m connection request count is not greater than the rejection threshold before the request is accepted by the server computer.

In another embodiment of the invention, computer readable media including computer program code for preventing a denial of service (DoS) attack by a requesting client on a server computer is disclosed. The computer readable medium includes computer program code for receiving a connection request at a time $t_n$ in a throttling interval m, computer program code for incrementing an interval m connection request count if the time $t_n$ is not at a beginning of the throttling interval m, and computer program code for determining if the interval m connection request count is greater than a rejection threshold associated with the requesting client. The computer readable medium also includes computer program code for rejecting the connection request if it is determined that the interval m connection request count is greater than the rejection threshold, computer program code for waiting an interval m wait time if it is determined that the interval m connection request count is not greater than the rejection threshold, and computer program code for accepting the request by the server computer.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

Broadly speaking the invention describes an IP throttler that is an Internet standards-based protocol and system for defending against a potential denial of service (DoS) attack. The IP throttler is designed to prevent denial of service attacks by either artificially slowing down the processing of connections from an attacker's IP address to the server, or by refusing additional connections for a period of time. In order to determine whether a particular client is a potential attacker, the IP throttler records all connecting IP addresses thereby allowing the server to detect attackers as soon as the volume of connection requests coming from a particular IP address is higher than otherwise would be expected. Once it has been determined that a particular IP address is that of an attacker, the IP throttler retaliates by either waiting for a certain amount of time before accepting connections from this IP address, or, in some cases, by rejecting a portion of the attacker's connection requests.

In a preferred embodiment, time is divided into intervals (one such interval is called a throttling interval) in which the number of connections per client IP address is recorded. If a particular client's connection request rate is greater than a rejection threshold associated with that client, the IP throttler will refuse any new connections from the client until the beginning of the next throttling interval.

In addition to the rejection threshold, a slowdown threshold provides the maximum number of connections per time interval (such as a throttling interval) from a particular IP address that the server is willing to accept without slowing down new incoming connections. If the incoming connection rate from the particular IP address always stays below the slowdown threshold, no throttling is applied to this IP address. If, however, during the previous throttling interval, there are connections in excess of the slowdown threshold, then what is referred to as a wait time is used to delay the incoming connection request stream. In particular, the wait time is related to the number of connection requests (hits) above the slowdown threshold as referred to as a slowdown rate. For example, the slowdown rate represents how many hourly connections in excess of the slowdown threshold will cause one second of wait time.

In the following description, frameworks and methods of providing an apparatus and system for providing a DoS defense against a server computer in a distributed environment are described. Such distributed environments are exemplified by those networks that utilize SMTP requests and responses. Although the invention will initially be described in terms of a multithreaded, object oriented computing system implemented using SMTP requests and responses, it should be noted that the present invention can be used in any system that is capable of handling well defined requests and responses across a distributed network.

It should also be noted that although the invention is described in terms of the Internet, any distributed network could be suitably employed to implement any desired embodiment of the invention.

The invention will now be described in terms of an electronic messaging system, such as an email system, having a server computer that is part of a large network of computers typical of, for example, the Internet coupled to a client computer capable of generating any number of connection requests within a particular time interval.

Figure 2:
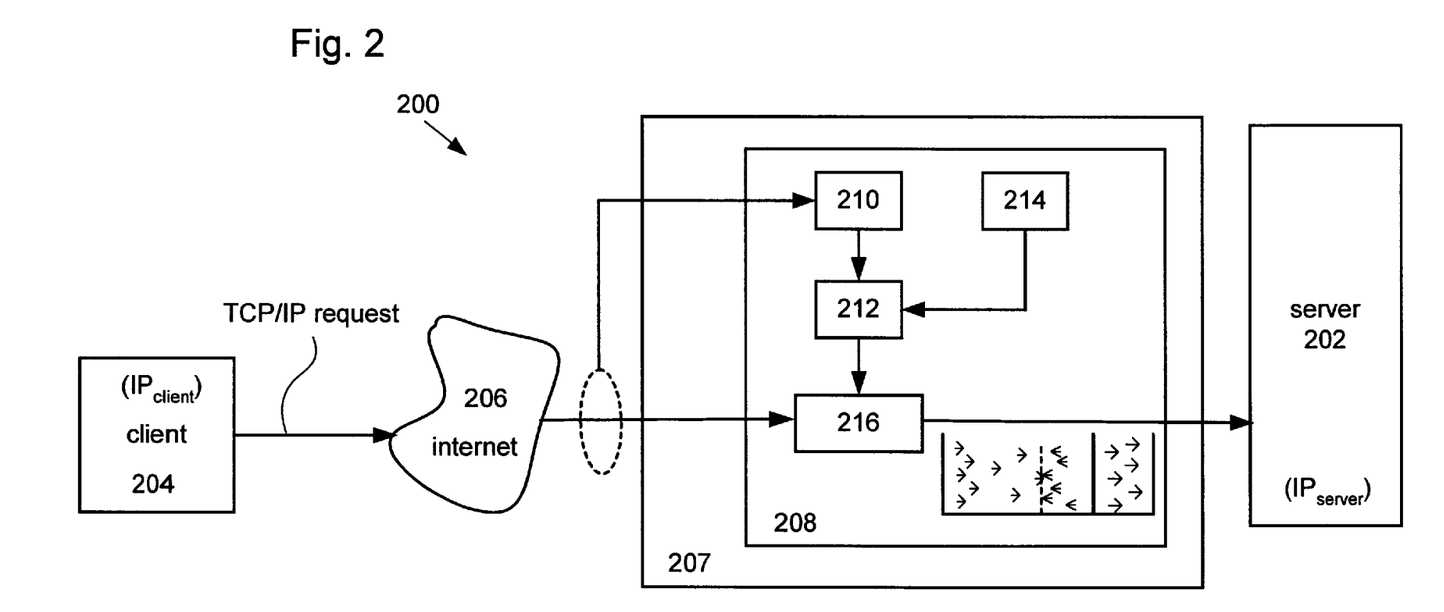
FIG. 2 shows a messaging system in accordance with an embodiment of the invention.

Referring now to FIG. 2, a messaging system 200 in accordance with an embodiment of the invention is described. The messaging system 200 includes a server computer 202 coupled to a client computer 204 by way of an interconnected network of computers 206, which in this example, is the Internet. When the client computer 204 desires to communicate with the server computer 202 in order, for example, to submit an email message, the client computer will generate a connection request that is typically based upon the well known TCP/IP protocol. As well known in the art, TCP (Transmission Control Protocol) is a method used aloing with the Internet Protocol (IP) to send data in the form of message units between computers over the Internet. While IP takes care of handling the actual delivery of the data, TCP takes care of keeping track of the individual units of data (referred to as packets) that a message is divided into for efficient routing through the Internet.

In the most widely installed level of the Internet Protocol, an IP address is a number (currently a 32 bit number) that identifies each sender or receiver of information that is sent in packets across the Internet. For example, the Internet Protocol part of TCP/IP includes an IP address associated with the receiver in the message and sends it to the IP address that is obtained by looking up the domain name in the Universal Resource locator in an HTTP (i.e., WEB page) type request or in the e-mail address in an email type request. The recipient can see the IP address of the Web page requestor or the email sender and can respond by sending another message using the IP address it received. An IP address has two parts: the identifier of a particular network on the Internet and an identifier of the particular device (which can be a server or a workstation) within that network.

Therefore, in the arraingement shown in FIG. 2, the client computer 204 has associated with it a unique IP address ($IP_{client}$) as well as does the server computer 202 ($IP_{server}$). In order to request a connection to the server computer 202, the client computer 204 generates a TCP/IP based connection request that includes both the client IP address $IP_{client}$ and the server IP address, $IP_{server}$. Once the connection request has been successfully routed to the server computer 202, a firewall 206 included in or coupled to the server computer 202 monitors all incoming connection requests. In the described embodiment, the firewall 206 includes an throttler unit 208 that is used to identify and prevent any denial of service (DoS) attacks. The throttler unit 208 includes a connection request monitor 210 arraigned to monitor the number of connection requests received by a particular requesting client based upon the requesting clients unique IP address. A processor unit 212 coupled to the connection request monitor 210 is configured to count the number of connection requests for a particular requestor based upon its associated IP address per unit of time, also referred to as a throttling interval. A memory 214 coupled to the processor unit 212 is used to store various threshold values that are used to determine whether or not a particular client can be characterized as an attacker, and if so, how to prevent the attack from adversely affecting the operation of the server computer 202.

Figures 3A, 3B:
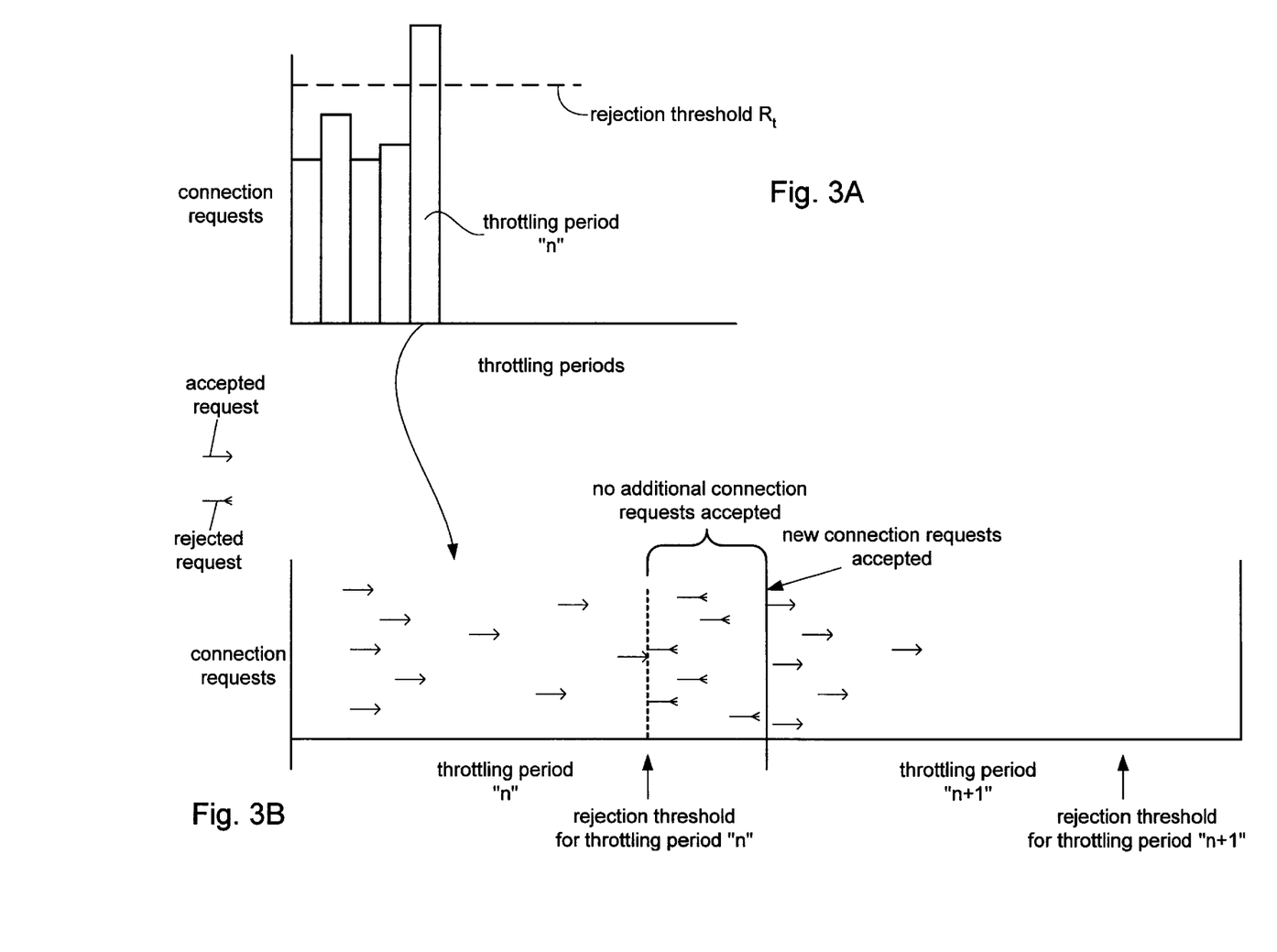
FIG. 3A and FIG. 3B illustrates throttling a connection request stream based upon a rejection threshold in accordance with an embodiment of the invention.

For example, with reference to FIG. 2, FIG. 3A and FIG. 3B, time is divided into intervals (one such interval is called a throttling interval) in which the number of connections per client IP address is recorded in the memory 214. A rejection threshold $R_t$ is the maximum number of connections per throttling interval (connection request rate) from one IP address that the server computer 202 is willing to accept without rejecting incoming connections. If a particular client's connection request rate is greater than the rejection threshold $R_t$ for that client as determined by the processor unit 212, the processor unit 212 will direct an throttler unit 216 to refuse any new connection requests from the client until the beginning of the next throttling interval. In particular, the processor unit 212 has determined that during a throttling interval n, a particular client's connection request rate has exceeded its associated rejection rate $R_t$. Once the rejection rate $R_t$ has been exceeded, the processor unit 212 directs the throttler unit 216 to reject new connection requests from the offending requestor until the start of a next throttling interval n+1. In this way, the attacker does not know that the DoS attack has been discovered and subsequently thwarted so there is no motivation to change client IP addresses.

In addition to the rejection threshold $R_t$, a slowdown threshold $SLD_t$ provides the maximum number of connections per unit of time (such as an hour) from one IP address that the server computer 202 is willing to accept without slowing down new incoming connections. If the incoming connection rate from one IP address always stays below the slowdown threshold $SLD_t$, no throttling is applied to the stream of connection requests coming from a particular IP address. If, however, during the previous throttling interval, the connection request rate is in excess of the slowdown threshold $SLD_t$, the IP throttler unit 216 slows down the connection request rate stream by what is referred to as a wait time. In a preferred embodiment, the wait time is based on the slowdown rate that represents how many connections per unit time (such as an hour) in excess of the slowdown threshold will cause one second of wait time. In one embodiment, after a throttling interval has ended, the wait time associated with an IP address is calculated/updated according to the number of connections coming from this IP address during this throttling interval. It should be noted that the relationship between the slowdown threshold $SLD_t$, and rejection $R_t$ can be set according to the needs of a particular system.

Figure 4:
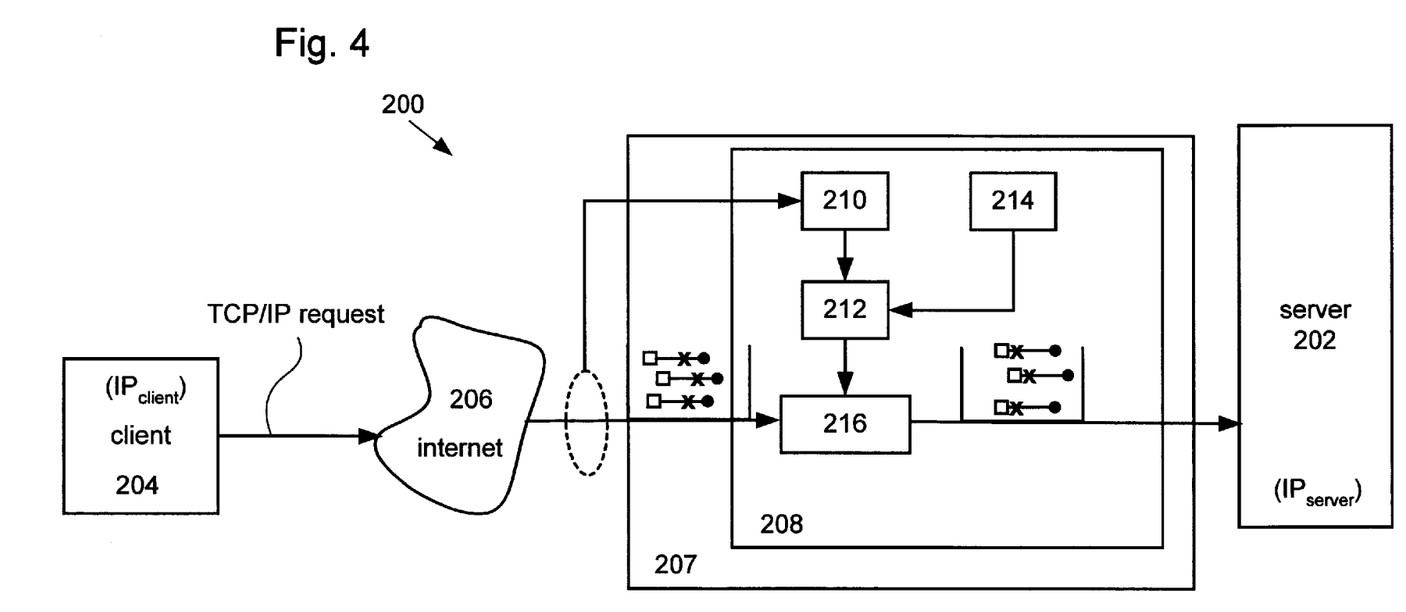
FIG. 4 shows a messaging system in accordance with an embodiment of the invention.
Figures 5A, 5B:
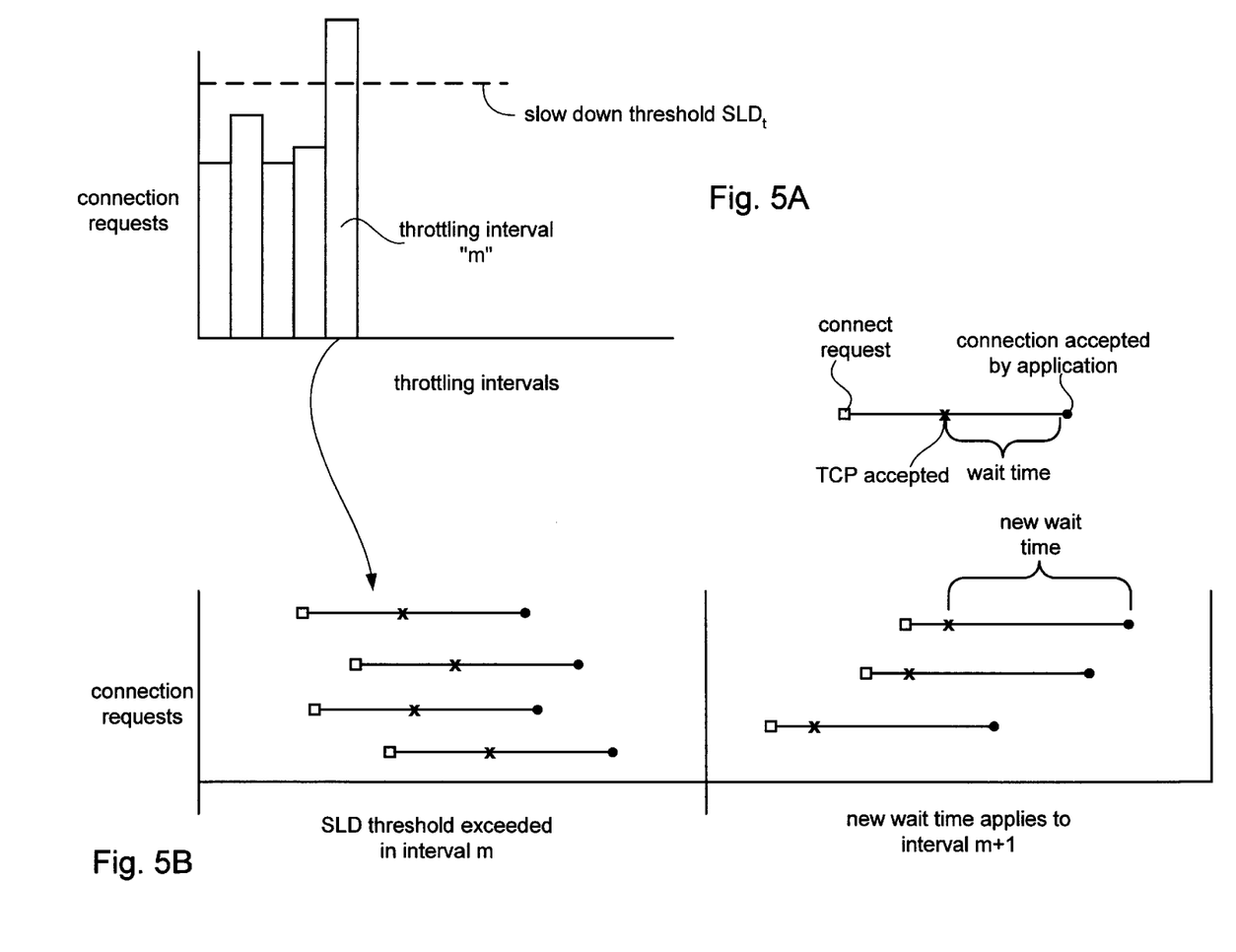
FIG. 5A and FIG. 5B illustrates throttling a connection request stream based upon a slowdown threshold in accordance with an embodiment of the invention.

In particular, with reference to FIG. 4, FIG. 5A, and FIG. 5B, time is divided into throttling intervals m in which the number of connections per client IP address is monitored by the monitoring unit 210 and recorded in the memory 214. If a particular client's connection request rate for a throttling interval m is greater than the slowdown threshold $SLD_t$, for that client as determined by the processor unit 212, the processor unit 212 will direct the IP throttler unit 216 to slow down the incoming connection request stream by a wait time Wt for the next throttling interval m+1. In this way, the attacker does not know that the DoS attack has been discovered and subsequently thwarted so there is no motivation to change client IP addresses. For example, in FIG. 5B, the interval between the TCP accept and connection accepted by the application is increased by the wait time $W_t$ in the interval m+1.

Figure 6:
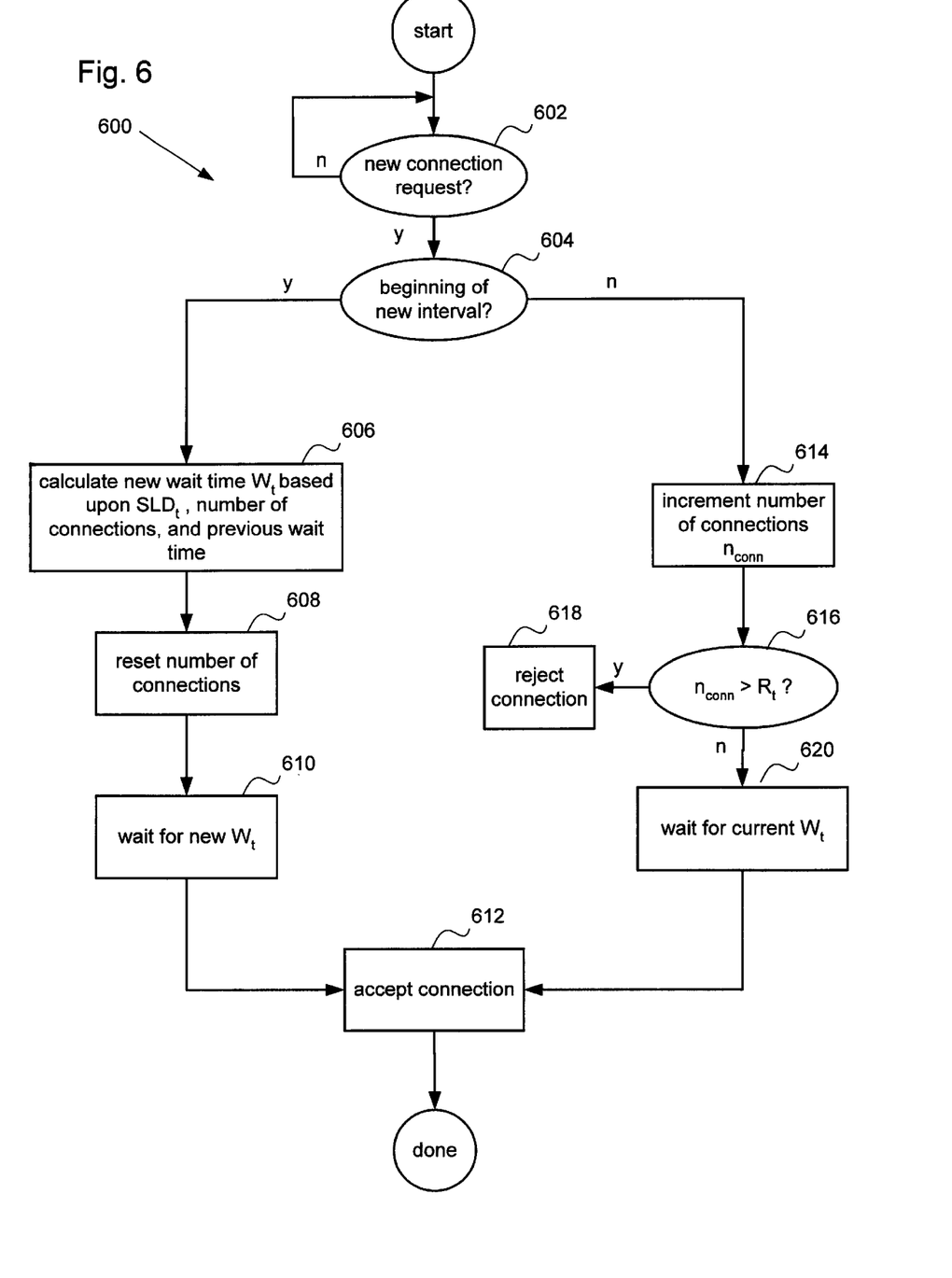
FIG. 6 shows a flowchart detailing a process for providing a DoS defense in accordance with an embodiment of the invention.

FIG. 6 shows a flowchart detailing a process 600 for throttling a connection request stream in accordance with an embodiment of the invention. The process 600 begins at 602 by determining whether or not a new connection request has been received. When a new connection request has been received, a determination is made at 604 whether or not it is the beginning of a new interval. If it is determined that a new interval has begun, then a new wait time $W_t$ is calculated at 606. In one implementation the new wait time is based upon the number of connections received during the interval, the slowdown threshold SLDT, and the previous wait time.

Once the new wait time is calculated, the number of connections $n_{conn}$ is reset at 608 and at 610 the connection request is delayed for a period of time equal to the new wait time $W_t$ after which the connection is accepted by the application at 612.

Returning to 604, if it has been determined that the interval is not a beginning of a new interval, then at 614 the number of connections $n_{conn}$ is incremented. At 616, a determination is made whether or not the incremented $n_{conn}$ is greater than the rejection threshold Rt. If it is determined that the incremented $n_{conn}$ is greater then the rejection threshold Rt, then the connection request is rejected at 618, otherwise, the connection request is delayed by a current wait time at 620. For example, in one implementation, the interval between the TCP accept and connection accepted by the application is the current time $W_t$. After the wait time has elapsed, the connection is accepted by the application at 612.

Figure 7:
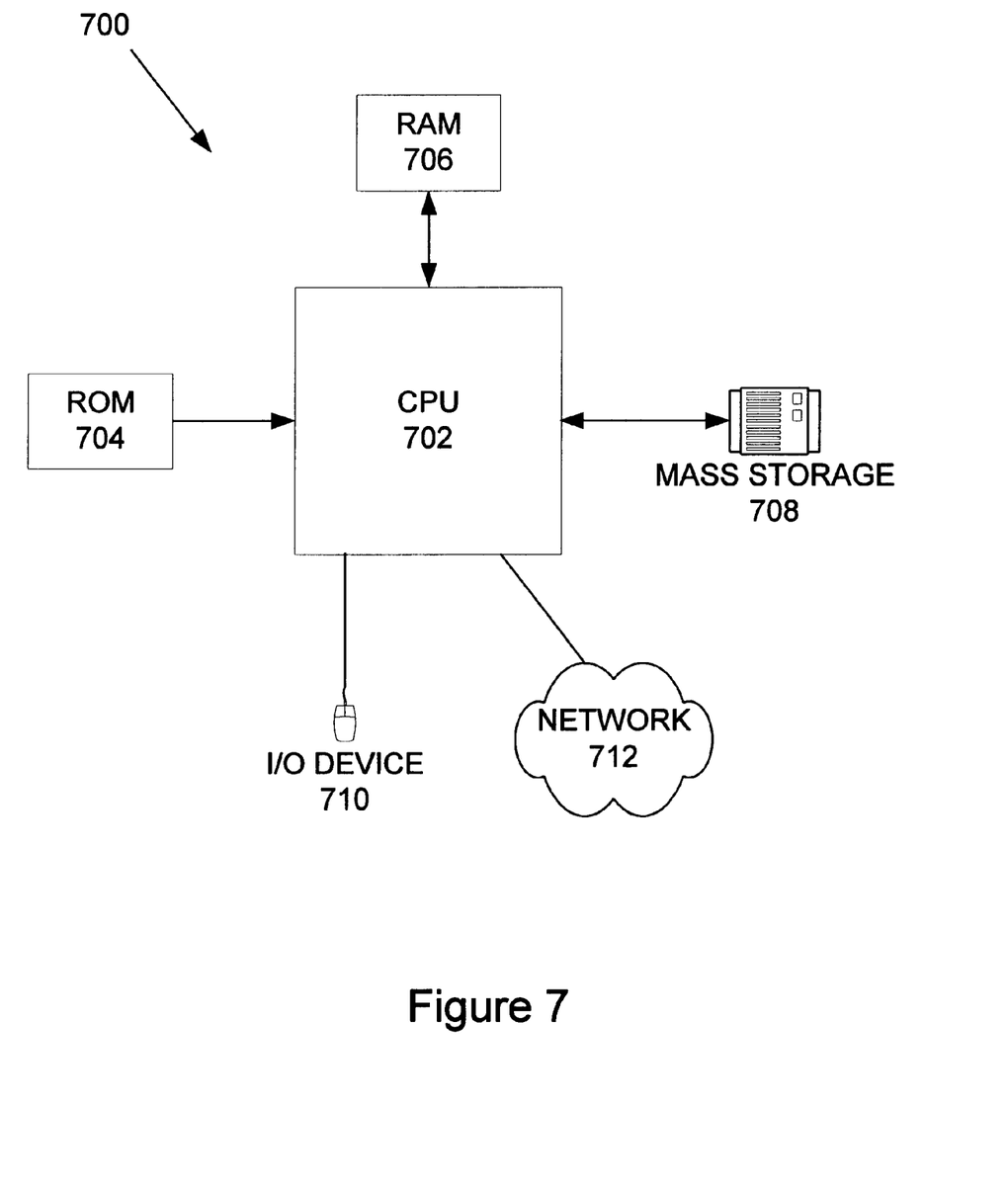
FIG. 7 illustrates a typical, general-purpose computer system suitable for implementing the present invention.

FIG. 7 illustrates a typical, general-purpose computer system suitable for implementing the present invention. As is well known in the art, ROM acts to transfer data and instructions uni-directionally to CPUs 702, while RAM is used typically to transfer data and instructions in a bi-directional manner. CPUs 702 may generally include any number of processors. Both primary storage devices 704, 706 may include any suitable computer-readable media. A secondary storage medium 708, which is typically a mass memory device, is also coupled bi-directionally to CPUs 702 and provides additional data storage capacity. The mass memory device 708 is a computer-readable medium that may be used to store programs including computer code, data, and the like. Typically, mass memory device 708 is a storage medium such as a hard disk or a tape which generally slower than primary storage devices 704, 706. Mass memory storage device 708 may take the form of a magnetic or paper tape reader or some other well-known device. It will be appreciated that the information retained within the mass memory device 708, may, in appropriate cases, be incorporated in standard fashion as part of RAM 706 as virtual memory. A specific primary storage device 704 such as a CD-ROM may also pass data uni-directionally to the CPUs 702.

CPUs 702 are also coupled to one or more input/output devices 710 that may include, but are not limited to, devices such as video monitors, track balls, mice, keyboards, microphones, touch-sensitive displays, transducer card readers, magnetic or paper tape readers, tablets, styluses, voice or handwriting recognizers, or other wellknown input devices such as, of course, other computers. Finally, CPUs 702 optionally may be coupled to a computer or telecommunications network, e.g., an Internet network or an intranet network, using a network connection as shown generally at 712. With such a network connection, it is contemplated that the CPUs 702 might receive information from the network, or might output information to the network in the course of performing the above-described method steps. Such information, which is often represented as a sequence of instructions to be executed using CPUs 702, may be received from and outputted to the network, for example, in the form of a computer data signal embodied in a carrier wave. The above-described devices and materials will be familiar to those of skill in the computer hardware and software arts.

Although only a few embodiments of the present invention have been described, it should be understood that the present invention may be embodied in many other specific forms without departing from the spirit or the scope of the present invention. Operations may also be removed or added without departing from the spirit or the scope of the present invention.

Although the methods for preventing a DoS attack in a distributed network in accordance with the present invention are particularly suitable for implementation with respect to a Java™ based environment, the methods may generally be applied in any suitable object-based environment. In particular, the methods are suitable for use in platform-independent object-based environments. It should be appreciated that the methods may also be implemented in some distributed object-oriented systems.

What is claimed is:

1. In a client/server environment, a method for preventing a denial of service (DoS) attack by a requesting client on a server computer, comprising:

receiving a connection request at a time $t_n$;
   if the time $t_n$ is within throttling interval m,
      incrementing an interval m connection request count;
      determining if the interval m connection request count is greater than a rejection threshold associated with the requesting client;
      if it is determined that the interval m connection request count is greater than the rejection threshold, rejecting the connection request;
      if it is determined that the interval m connection request count is not greater than the rejection threshold, waiting an interval m wait time; and
      accepting the request by the server computer.

2. A method as recited in claim 1, further comprising:
   if the time $t_n$ is at a beginning of a throttling interval m+1, where the throttling interval m+1 is subsequent to the throttling interval m,
   calculating a throttling interval m+1 wait time based upon,
      a slow down threshold associated with the requesting client,
      a total number of connection requests for the throttling interval m, and
      the interval m wait time;
   setting a throttling interval m+1 connection request count to zero;
   waiting the throttling interval m+1 wait time; and
   accepting the request by the server computer.

3. A method as recited in claim 2, wherein the throttling interval m+1 wait time is related to a difference between a throttling interval m+1 connection request count and the slowdown threshold.

4. A method as recited in claim 3, wherein the connection request is a TCP/IP type connection request.

5. A method as recited in claim 4, wherein the waiting the throttling interval m+1 wait time for the connection request is a duration of time between a TCP accepted event and a connection accepted by an application event.

6. A method as recited in claim 1, wherein the requesting client is identified based upon a requesting client IP address uniquely associated with the requesting client.

7. A method as recited in claim 6, wherein the requesting client is one of a plurality of requesting clients, each of which is uniquely identified by an associated requesting client IP address.

8. A method as recited in claim 7, wherein the rejection threshold is one of a plurality of rejection thresholds each being associated with an associated one of the plurality of requesting clients.

9. A method as recited in claim 7, wherein the slowdown threshold is one of a plurality of slowdown thresholds each being associated with an associated one of the plurality of requesting clients.

10. A method as recited in claim 1, wherein the server computer is an electronic messaging system.

11. An apparatus for preventing a denial of service (DoS) attack by a requesting client on a server computer in a client/server environment, comprising:

a connection request receiver unit for receiving a connection request at a time $t_n$ from the requesting client;

an incrementing unit coupled to the connection request receiver unit for incrementing an interval m connection request count when the time $t_n$ is within but not at a beginning of a throttling interval m;

a processor unit coupled to the interval m connection request count buffer arrainged to determine if the interval m connection request count is greater than a rejection threshold associated with the requesting client; and a request throttler unit coupled to the processor unit arrainged to,
reject the connection request when it is determined that the interval m connection request count is greater than the rejection threshold, and
wait an interval m wait time when it is determined that the interval m connection request count is not greater than the rejection threshold before the request is accepted by the server computer.

12. An apparatus as recited in claim 11 wherein when the time $t_n$ is at a beginning of a throttling interval m+1, where the throttling interval m+1 is subsequent to the throttling interval m then the processor calculates a throttling interval m+1 wait time is based upon, a slow down threshold associated with the requesting client, a total number of connection requests for the throttling interval m, and the interval m wait time, and wherein the processor sets a throttling interval m+1 connection request count to zero, and wherein the request throttler unit waits the throttling interval m+1 wait time before the server computer accepts the request.

13. A method as recited in claim 12, wherein the throttling interval m+1 wait time is related to a difference between a throttling interval m+1 connection request count and the slowdown threshold.

14. A method as recited in claim 13, wherein the connection request is a TCP/IP type connection request.

15. A method as recited in claim 14, wherein the waiting the throttling interval m+1 wait time for the connection request is a duration of time between a TCP accepted event and a connection accepted by an application event.

16. A computer readable media including computer program code for preventing a denial of service (DoS) attack by a requesting client on a server computer, said computer readable media comprising:

computer program code for receiving a connection request at a time $t_n$;

computer program code for incrementing an interval m connection request count if the time $t_n$ is within a throttling interval m;

computer program code for determining if the interval m connection request count is greater than a rejection threshold associated with the requesting client;

rejecting the connection request if it is determined that the interval m connection request count is greater than the rejection threshold;

computer program code for waiting an interval m wait time if it is determined that the interval m connection request count is not greater than the rejection threshold; and computer program code for accepting the request by the server computer.

17. A computer readable media including computer program code for preventing a denial of service (DoS) attack by a requesting client on a server computer as recited in claim 16, further comprising:

computer program code for calculating a throttling interval m+1 wait time when the time $t_n$ is at a beginning of a throttling interval m+1, where the throttling interval m+1 is subsequent to the throttling interval m, wherein the calculating is based upon a slow down threshold associated with the request client, a total number of connection requests for the throttling interval m, and the interval m wait time;

computer program code for setting a throttling interval m+1 connection request count to zero;

computer program code for waiting the throttling interval m+1 wait dime; and computer program code for accepting the request by the server computer.

* * * * *

UNITED STATES PATENT AND TRADEMARK OFFICE
CERTIFICATE OF CORRECTION

PATENT NO. : 6,789,203 B1
DATED : September 7, 2004
INVENTOR(S) : Jacques E. Belissent It is certified that error appears in the above-identified patent and that said Letters Patent is hereby corrected as shown below:

Column 5,
Line 15, change "used aloing" to -- used along --.
Line 36, change "arraingement shown" to -- arrangement shown --.

Column 9,
Line 32, change "time is based" to -- time that is based --.

Column 10,
Line 36, change "request client" to -- requesting client --.
Line 42, change "wit dime" to -- wait time --.

Signed and Sealed this

Twenty-third Day of November, 2004

JON W. DUDAS
*Director of the United States Patent and Trademark Office*